United States Patent [19]

Helling et al.

[11] Patent Number: 4,585,724

[45] Date of Patent: Apr. 29, 1986

[54] IMAGE RECEPTOR LAYER COMPRISING POLYVINYL IMIDAZOLE AND CATIONIC POLYMER

[75] Inventors: Günter Helling, Odenthal; Manfred Peters, Leverkusen, both of Fed. Rep. of Germany

[73] Assignee: Agfa Gevaert Aktiengesellschaft, Leverkusen, Fed. Rep. of Germany

[21] Appl. No.: 671,219

[22] Filed: Nov. 14, 1984

[30] Foreign Application Priority Data

Nov. 25, 1983 [DE] Fed. Rep. of Germany ....... 3342629
Jul. 6, 1984 [DE] Fed. Rep. of Germany ....... 3424899

[51] Int. Cl.$^4$ .......................... G03C 1/40; G03C 5/54
[52] U.S. Cl. ..................................... 430/213; 430/941
[58] Field of Search ....................... 430/213, 941, 518; 526/263

[56] References Cited

U.S. PATENT DOCUMENTS

| 2,484,430 | 10/1949 | Sprague et al. | 430/941 |
| 4,115,124 | 9/1978 | Hamilton et al. | 430/518 |
| 4,124,386 | 11/1978 | Yoshida et al. | 430/213 |
| 4,273,853 | 6/1981 | Ponticello et al. | 430/213 |
| 4,282,305 | 8/1981 | Brust et al. | 430/213 |
| 4,415,647 | 11/1983 | Klein et al. | 430/213 |

Primary Examiner—Richard L. Schilling
Attorney, Agent, or Firm—Connolly and Hutz

[57] ABSTRACT

An image receptor layer suitable for the production of dye diffusion images with improved light fastness contains, as mordant, a mixture of from 5 to 70%, by weight, of a polymer containing cationic groups and obtained by homo- or co-polymerization of ethylenically unsaturated monomers and from 30 to 95%, by weight, of a second polymer, which is free from cationic groups and has been obtained by homo- or statistical co-polymerization of N-vinyl imidazole or 2-methyl-2-vinyl imidazole and optionally other co-polymerizable monomers.

3 Claims, No Drawings

IMAGE RECEPTOR LAYER COMPRISING POLYVINYL IMIDAZOLE AND CATIONIC POLYMER

This invention relates to an image receptor layer for the dye diffusion transfer process, containing a polymer having cationic groups and another polymer which is free from cationic groups and is derived from N-vinylimidazole or 2-methyl-1-vinyl-imidazole.

It is known that the light-sensitive recording material used for the dye diffusion transfer process, which is particularly important for instant colour photography, contains several silver halide emulsion layers differing in spectral sensitivity and colour-providing compounds associated with these layers. The colour-providing compounds may be, for example, so-called "dye developers", which are originally diffusible compounds carrying a chromophoric group and a developer function which immobilises the compounds imagewise in the course of development, or they may be non-diffusible compounds carrying a chromophoric group which is released imagewise in the course of development as a diffusible dye or dye precursor (dye releaser).

To fix the image dyes which are generally obtained in an anionic form from the colour-providing compounds, the image receptor layer contains cationic compounds as mordants. These usually consist of polymeric ammonium or phosphonium compounds. Polymers having a wide variety of cationic structural units are known for this purpose, e.g. some which contain the cationic groups in the form of side chains on a polymer structure, such as those described in U.S. Pat. No. 3,709,690, and some which contain the cationic groups directly in the polymer chain, for example the polymers obtained by quaternisation of basic polyurethanes, polyureas or polyurea polyurethanes (DE-A-2,631,521). The known cationic polymers used as mordants, however, are not yet satisfactory as regards the stability to light of the anionic image dyes fixed on them.

It has been found that the stability to light of image dyes mordanted on cationic polymers may be considerably improved by using a cationic polymer which has been obtained by the homo- or co-polymerisation of ethylenically unsaturated monomeric compounds and by adding to this cationic polymer a homo- or copolymer of N-vinylimidazole or 2-methyl-1-vinylimidazole which is free from cationic groups.

The present invention relates to an image receptor layer for the dye diffusion transfer process containing, as mordant for diffusible anionic dyes, a polymer containing cationic groups and obtained by the homo- or copolymerisation of ethylenically unsaturated monomers, characterised in that the mordant contained in the image receptor layer is a mixture of from 5 to 70%, by weight, of the polymer containing cationic groups and from 30 to 95%, by weight, of a second polymer, which is free from cationic groups and has been obtained by the homo- or statistic co-polymerisation of N-vinylimidazole or of 2-methyl-1-vinylimidazole and optionally other copolymerisable monomers.

The image receptor layer according to the present invention thus contains a mixture of two mordants, one of which is a conventional polymer containing cationic groups, while the other, which is free from cationic groups, may be represented by the following general formula (I):

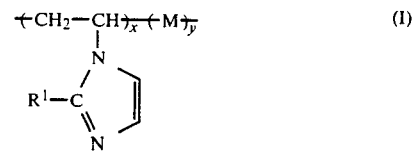

wherein
$R^1$ represents H or $-CH_3$;
M represents polymerised units of a monomer which is copolymerisable with vinyl imidazole, but is free from cationic groups; and
x and y represent the numerical values characterising the proportion of the individual comonomers in the polymer, such that
x may have a value of from 80 to 100% and
y a value of from 0 to 20%.

Examples of comonomers which M may represent include (meth)acrylamides, such as acrylamide or N,N-dimethylacrylamide; (meth)acrylates, such as ethyl acrylate, methyl methacrylate, chloroethylmethacrylate, hydroxyethylacrylate or butylacrylate; aromatic vinyl compounds, such as styrene or vinyl toluene, and N-vinylpyrrolidone, vinyl acetate or N-methyl-N-vinyl-acetamide. Instead of containing a single comonomer copolymerisable with vinyl imidazole, the copolymer may contain two or more such comonomers copolymerisable with vinyl imidazole, in a polymerised form, which in this case would all be represented by M. The symbol M may also represent polymerised units of co-monomers which do not exist in the form of ethylenically unsaturated compounds, but may be obtained in this form by polymer analogous reactions, e.g. vinyl alcohol or vinylamine.

The polyvinylimidazoles used according to the present invention may be prepared by conventional polymerisation processes, e.g. by emulsion polymerisation, solution polymerisation or precipitation polymerisation of N-vinyl imidazole or 2-methyl-1-vinyl imidazole, optionally with one or more monoethylenically unsaturated comonomers M which are copolymerisable with vinyl imidazole. In the case of emulsion polymerisation, this is advantageously carried out in the presence of an anionic surface active compound, such as sodium lauryl sulphate, or in the presence of the sodium salt of a sulphonated condensate of an alkyl phenol/ethylene oxide condensate (e.g. "Alipal", manufactured by General Dyestuff Corp., USA) and preferably in the presence of a radical-former or radical-initiator, for example in the presence of an initiator of the redox-type which forms free radicals, e.g. in the presence of potassium persulphate/sodium bisulphite; potassium persulphate-$Fe^{2+}$; or $H_2O_2$—$Fe^{2+}$. Such processes as those described in U.S. Pat. No. 3,072,588, for example, may be employed.

The use of polyvinylimidazole in image receptor elements is known, e.g. from U.S. Pat. No. 4,282,305, but only in connection with a layer containing a compound which gives rise to metal ions. Such image receptor elements are suitable for use in combination with light-sensitive elements which release image dyes in the form of diffusible, chelatizable dyes. The image dyes are fixed in the image receptor element in the form of light stable dye-metal complexes by complex formation with the metal ions. The polyvinylimidazole then serves mainly to prevent diffusion of the metal ions into the light-sensitive element, but the dye images obtained in the absence of metal ions have little stability to light.

The polymer containing cationic groups is one which, as mentioned above, has been obtained by the homo- or co-polymerisation of ethylenically unsaturated monomeric compounds. The cationic groups are preferably quaternary groups corresponding to the following general formula (II):

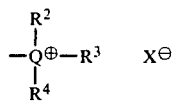

wherein

Q represents a nitrogen or phosphorus atom;

$R^2$, $R^3$ and $R^4$ each represents an alkyl group or a carbocyclic group, and $R^2$, $R^3$ and $R^4$ may be the same or different or two of these groups may together serve to complete a 5- or 6-membered heterocyclic ring; and $X^\ominus$ represents an anion.

Alkyl groups represented by $R^2$, $R^3$ and $R^4$ in general formula (II) may be straight-chained or branched and normally have from 1 to 12 carbon atoms. Examples include methyl, ethyl, propyl, isobutyl, pentyl, hexyl, heptyl and dodecyl.

If $R^2$, $R^3$ and/or $R^4$ in general formula (II) represent carbocyclic groups, these may be substituted or unsubstituted cycloalkyl, aralkyl or aryl groups, preferably having from 5 to 12 carbon atoms, e.g. cyclopentyl, cyclohexyl, benzyl, p-methylbenzyl, chlorobenzyl, nitrobenzyl, cyanobenzyl, methoxybenzyl, methoxycarbonylbenzyl, ethylthiobenzyl, phenyl or tolyl.

Examples of 5- or 6-membered heterocyclic rings completed by two of the groups $R^2$, $R^3$ and $R^4$ include the pyrrolidine, piperidine and morpholine rings.

The polymer containing cationic groups may be obtained by one of the conventional methods of addition polymerisation, e.g. by emulsion polymerisation from monomers which are capable of undergoing addition polymerisation and already contain a quaternary ammonium group or are readily quaternized, optionally in admixture with other addition polymerisable monomers. Quaternization or introduction of quaternary groups may also be carried out after polymerisation, e.g. by treating tertiary amino groups contained in the polymer with an alkylating quaternizing agent or by reacting groups in the polymer containing active halogen atoms with tertiary amines or phosphines.

Suitable cationic polymers have been described, for example, U.S. Pat. No. 3,709,690.

The proportion of cationic polymer to noncationic, polymeric vinyl imidazole in the image receptor layer according to the present invention may vary within the limits indicated. Excellent results as regards stability to light of the mordanted dyes are obtained with relatively high proportions of polymeric vinyl imidazole. The image receptor layer preferably contains a mixture of from 50 to 90%, by weight, of polyvinylimidazole and from 10 to 50%, by weight, of cationic polymer.

The mixture of non-cationic polymeric vinyl imidazole and cationic polymer may be cast as such or optionally with the addition of a binder to form the image receptor layer.

Apart from gelatine, other hydrophilic film-forming polymers of natural or synthetic origin are also suitable for use as binders, e.g. the following:

Gum arabic, albumin, casein, dextrin, starch ethers or cellulose ethers, polyvinyl alcohol, succinoylated polyvinyl alcohol, partially phthaloylated polyvinyl alcohol, polyacrylamide, copolymers of acrylic acid, vinyl pyrrolidone, hydroxyethylacrylamide, vinyl pyridine, maleic acid or maleic acid anhydride with acrylamide.

The image receptor layer may also contain a variety of conventional additives, such as UV absorbents, e.g. substituted 2-hydroxyphenyl-benzotrizoles, ("Tinuvin") and hydroxybenzophenones, and antioxidants, e.g. t-butyl hydroxyanisole, butylated hydroxytoluene or substituted chromanols. Where such additives are soluble in organic solvents, they are advantageously used in the form of an emulsion in an aqueous medium. It may also be advantageous to use certain heavy metal ions in the image receptor layer to improve fixation of the dye, particularly $Zn^{2+}$ ions.

The mordants used according to the present invention may be used for the preparation of a wide variety of photographic materials containing a mordant layer for mordanting acid dyes.

According to the present invention, the above-mentioned polymers are mainly used as mordants for diffusible image dyes, i.e. they constitute a major component of image receptor layers for the dye diffusion transfer process. Such image receptor layers are normally arranged on a transparent or opaque layer support with which they form the image receptor element. This image receptor element may either be a separate image receptor sheet which is not sensitive to light or it may form an integral component of a light-sensitive recording material if the image receptor layer is attached to the light-sensitive silver halide emulsion layer or layers.

Examples of suitable layer supports include paper, optionally coated with a plastics material, glass, metal foils, or films of organic film-forming agents, such as cellulose esters, polyethylene terephthalate, polycarbonate or other polymers. The last-mentioned materials may also be used to form opaque layer supports by the incorporation of opacifying agents, such as pigments.

In its simplest form, the image receptor layer according to the present invention is arranged on a layer support and together with this support it forms the image receptor element in the form of an image receptor sheet. To improve the adherence of the image receptor layer to the layer support, the latter may be provided with a conventional adhesive layer. An image receptor sheet of this type is suitable mainly for every type of photographic dye diffusion transfer process in which acid, diffusible image dyes or acid, diffusible dye-forming compounds (image dye precursors) are used or are released imagewise and may be transferred to an image receptor layer. Such a material therefore contains an imagewise distribution of one or more acid dyes in the image receptor layer after transfer of these dyes or dye precursors.

According to one advantageous embodiment of the present invention, a photographic material comprises, in addition to an image receptor layer containing the polymer mixture according to the present invention, at least one layer having an acid dye or a precursor compound for an acid dye, and at least one light-sensitive layer, in particular a light-sensitive silver halide emulsion layer. The above-mentioned acid dyes, as well as the precursor compounds for acid dyes will be referred to hereinafter as colour-providing compounds. A photographic recording material may advantageously contain, in addition to the image receptor layer according to the present invention, a plurality of light-sensitive silver halide emulsion layers differing in spectral sensitivity and other, light-sensitive layers, such as intermediate layers, covering layers and other layers serving various functions of the type conventionally used in multilayered colour photographic recording materials for the dye diffusion transfer process.

The photographic materials according to the present invention, i.e. an image receptor sheet containing the image receptor layer according to the present invention, and in particular colour photographic recording materials containing an image receptor layer according to the present invention as an integral constituent, may in addition contain acid layers and so-called "retarding layers" which together form a so-called "neutralisation system". Such a neutralisation system may be arranged in known manner between the layer support and the image receptor layer above it or it may be arranged in some other position in the layer combination, e.g. above the light-sensitive layers, i.e. remote from these light-sensitive layers when viewed from the image receptor layer. The neutralisation system is normally orientated so that the retarding layer is situated between the acid layer and the position where the alkaline developer liquid or paste comes into action.

The colour-providing compounds associated with the light-sensitive layers may be coloured compounds which are diffusible and begin to diffuse when the layers are treated with an alkaline processing liquid, and are only fixed in the exposed areas as a result of development. Alternatively, the colour-providing compounds may be diffusion-resistant and release a diffusible dye in the course of development (dye-releasers).

Suitable dye-releasers have been described, for example, in the following documents: U.S. Pat. Nos. 3,227,550, 3,443,939, 3,443,940, DE-A-1,930,215, DE-A-2,242,762, DE-A-2,402,900, DE-A-2,406,664, DE-A-2,505,248, DE-A-2,543,902, DE-A-2,613,005, DE-A-2,645,656, DE-A-2,809,716, BE-A-86,241, ER-A-0 004 399, DE-A-3,008,588 and DE-A-3,014,669.

The diffusible dyes released from the dye-releasers may belong to the various classes of dyes, e.g. azo dyes, azomethine dyes, anthraquinone dyes, phthalocyanine dyes, indigoid dyes or triphenylmethane dyes. In combination with the image receptor layer according to the present invention, however, it is preferred to use dyes which do not form stable dye-metal complexes with metal ions in the image receptor layer.

EXAMPLE 1

Mordanting layers having the compositions indicated below were applied to a polyethylene-coated paper support. The substances applied per m² were: 4 g of gelatine and a total of 2 g of mordant polymer (sum of polymer containing cationic groups and polyvinylimidazole). The mordanting layers were hardened with 2% of 1,3,5-trisacryloylhexahydro-1,3,5-triazine.

Dyes GB 1, PP 1 and BG 1 were bathed into the resulting mordanting layers at pH 13.5 until they reached a density of about 1.5. After 2 minutes' washing, the layers were dried, covered over half their surface and exposed to UV light ($4.8 \times 10^6 1 \times .h$).

The percentage reduction in colour density in the exposed areas was then determined by measuring the colour density in the exposed and the unexposed areas.

TABLE

| Mordanting layer | Polymer | Polyvinyl imidazole | $\frac{\Delta D}{D}$ [%] | | |
|---|---|---|---|---|---|
| | | | GB1 | PP1 | BG1 |
| A | 2.0 g I | 0 | −64 | −93 | −94 |
| B | 1.0 g I | 1.0 g | −43 | −83 | −91 |
| C | 0.6 g I | 1.4 g | −38 | −75 | −86 |
| D | 2.0 g II | 0 | −82 | −99 | −95 |
| E | 1.4 g II | 0.6 g | −50 | −95 | −89 |
| F | 1.0 g II | 1.0 g | −21 | −86 | −82 |
| G | 0.6 g II | 1.4 g | −12 | −70 | −77 |
| H | 0.2 g II | 1.8 g | −21 | −47 | |

Polymer I: Poly-N,N—dimethyl-N—benzyl-N—acrylamidobenzyl ammonium chloride-CO—styrene-co-divinylbenzene (49,49,2) according to DE-A-2,846,004
Polymer II: Polystyrene-co-N,N—dimethyl-N—hexadecyl-N—methacryloylethyl ammonium bromide The lightfastness of the mordanted dyes is enhanced by the addition of polyvinylimidazole.

EXAMPLE 2

Mordanting layers were prepared as in Example 1, but using polymer III and 3.4 g of gelatine per m². The mordanting layers were coloured with dyes PP2 and BG2. The precedure was otherwise the same as in Example 1.

| Mordanting layer | Polymer III | Polyvinyl imidazole | $\frac{\Delta D}{D}$ | |
|---|---|---|---|---|
| | | | PP 2 | BG 2 |
| J | 2.0 g | 0 | −14 | −75 |
| K | 0.6 g | 1.4 g | −7 | −47 |

Polymer III: Poly-N,N—trimethyl-N—methacryoyl oxyethyl-ammonium-methyl sulphate according to DE-A-1,000,688.

EXAMPLE 3

A photographic recording material A (not according to the present invention) was prepared by applying the layers indicated below in succession to a transparent layer support of polyethylene terephthalate. The quantities given are based on 1 m².

1. A layer containing 0.6 g of the acetylation product of 4-methyl-phenidone and 1.3 g of gelatine
2. A red-sensitized silver halide emulsion layer containing 0.3 g of Ag, 0.2 g of dye-releaser 1 (cyan), 0.1 g of reducing agent and 1.0 g of gelatine
3. An intermediate layer containing 0.4 g of gelatine
4. A white pigment layer containing 16 g of $TiO_2$ and 2.3 g of gelatine
5. An intermediate layer containing 0.2 g of diisooctylhydroquinone and 4.0 g of gelatine
6. A mordanting layer containing 4.0 g of polymer III and 4.0 g of gelatine
7. A hardening layer containing 0.1 g of formaldehyde and 0.6 g of gelatine.

Another photographic recording material B (according to the present invention) was prepared in analogous manner, but the method differed from that described above in that layer 6 was prepared from 0.8 g of polymer III, 3.2 g of polyvinylimidazole and 4 g of gelatine.

A sample of each of the two recording materials A and B was exposed behind a grey wedge, developed, washed and dried. The following activators were used for development:
40 g of potassium hydroxide
3 g of potassium bromide 25 g of 2,2-methylpropyl-1,3-propane diol 20 g of 1,4-cyclohexane dimethanol (50%)

912 g of water.

To test the lightfastness of the mordanted colour images, both samples were exposed in a Xeno test apparatus (4.8×10⁶1×.h). The colour density of cyan fell by 55% in material A and by 11% in material B. The lightfastness is thus considerably improved in material B.

Annexe of formulae

GB 1

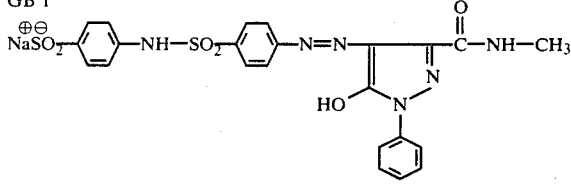

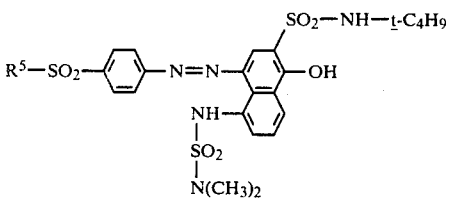

PP1 R⁵ = —SO₂⊖Na⊕
PP2 R⁵ = —SO₂—NH₂

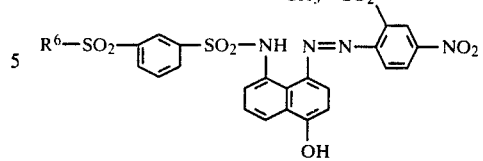

BG1 R⁶ = —SO₂⊖Na⊕
BG2 R⁶ = —SO₂—NH₂

Dye-releasing compound 1 (cyan)

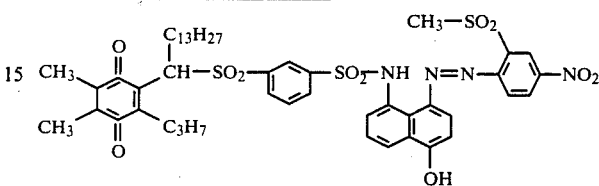

reducing agent

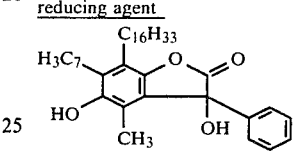

We claim:
1. A photographic element for the dye diffusion transfer process comprising at least one supported image receptor layer, consisting essentially of a mordant for diffusible anionic dyes, wherein the mordant is a mixture of from 5 to 70%, by weight, of a polymer containing cationic groups and obtained by homo or co-polymerisation of ethylenically unsaturated monomers, and from 30 to 95%, by weight, of a second polymer, which is free from cationic groups and has been obtained by homo- or statistical co-polymerisation of N-vinyl imidazole or 2-methyl-1-vinyl imidazole or of a mixture of N-vinyl imidazole or 2-methyl-1-vinyl imidazole and a co-polymerisable monomer.

2. A photographic element as claimed in claim 1 having a UV absorbent in the image receptor layer.

3. A photographic element as claimed in claim 1 having a heavy metal ion in the image receptor layer.

* * * * *